US006896573B1

(12) United States Patent
Rogers

(10) Patent No.: US 6,896,573 B1
(45) Date of Patent: May 24, 2005

(54) ANIMATED NOVELTY BANK AND ITS METHOD OF OPERATION

(76) Inventor: Anthony R. Rogers, 29 Friends La., Newtown, PA (US) 18940

( * ) Notice: Subject to any disclaimer, the term of this patent is extended or adjusted under 35 U.S.C. 154(b) by 0 days.

(21) Appl. No.: 10/700,915

(22) Filed: Nov. 5, 2003

(51) Int. Cl.[7] .............................................. A63H 1/12
(52) U.S. Cl. .......................................... 446/8; 440/10
(58) Field of Search ....................... 446/8, 10, 11, 12, 446/13; 206/0.8, 0.85, 0.81; 232/4 R, 1 D

(56) References Cited

U.S. PATENT DOCUMENTS

| | | | |
|---|---|---|---|
| 2,448,951 A | * 9/1948 | Baum | 446/12 |
| 2,648,934 A | * 8/1953 | Syfert | 446/9 |
| 5,465,909 A | 11/1995 | Roth | |
| 6,116,977 A | 9/2000 | Tanny et al. | |
| 6,435,930 B1 | * 8/2002 | Higgins | 446/12 |
| 6,454,570 B1 | * 9/2002 | Woods | 434/107 |
| 6,595,385 B2 | * 7/2003 | Nakamoto et al. | 221/24 |
| 6,651,797 B1 | * 11/2003 | Tree | 194/352 |
| 2002/0066137 A1 | * 6/2002 | Krvavica et al. | 4/405 |
| 2004/0077251 A1 | * 4/2004 | Kim | 446/8 |

FOREIGN PATENT DOCUMENTS

GB 2246338 A * 1/1992

* cited by examiner

*Primary Examiner*—Derris H. Banks
*Assistant Examiner*—Faye Francis
(74) *Attorney, Agent, or Firm*—LaMorte & Associates

(57) ABSTRACT

A novelty bank assembly and its associated method of operation. The novelty bank assembly includes a bank structure that defines an internal money compartment. An animated character is also provided that is connected to the bank structure. Within the novelty bank assembly is a microprocessor that senses when money is added to or removed from the money compartment. The microprocessor also controls movements of the animated character and broadcasts selected audible phrases. The microprocessor moves the animated character and broadcasts selected phrases depending upon the condition of the novelty bank assembly and the action of a person using the novelty bank assembly.

7 Claims, 4 Drawing Sheets

ANIMATED NOVELTY BANK AND ITS METHOD OF OPERATION

BACKGROUND OF THE INVENTION

1. Field of the Invention

The present invention relates to banks, such as piggy banks, that are used by individuals to store small amounts of money. More particularly, the present invention relates to animated banks that contain a character that animates when money is placed into the bank.

2. Description of the Prior Art

Banks for saving coins have been in existence for as long as coined money has been made. In earlier times, coins were stored in jars and pots. In England, a common clay used to make such jars was known as pygg clay. The jars were, therefore, known as pygg jars. Over the years, pygg jars evolved into pygg banks, which are now commonly referred to as piggy banks.

During much of the $19^{th}$ century, the making of piggy banks evolved into an art form. By the end of the $19^{th}$ century, mechanical banks were in fashion, wherein the banks were part bank and part toy. Banks were made with complex mechanical workings that animated parts of the bank. The animation was used either to collect the coins into the bank or animate a toy when a coin was placed into the bank.

However, over time, the popularity of novelty banks waned and the art form became antiquated. In the subsequent century, a nominal number of novelty banks have been designed. These modern novelty banks do little more than mimic the function of their mechanical ancestors. However, in a few instances, novelty banks have been fitted with electronic sensors that enable the novelty bank to perform functions not achievable by earlier mechanical novelty banks. For instance, in U.S. Pat. No. 6,116,977 to Tanny, entitled Collection Box, a collection box type of bank is shown with a sensor that senses a passing person. Once a passing person is detected, the collection box generates an audio signal to invite a person to place money into the collection box.

In U.S. Pat. No. 5,465,909 to Roth, entitled Talking Contribution Box shows a bank with a coin sensor. When a coin is placed into the bank, the bank generates an audio signal that thanks the person for the contribution of money.

Antique novelty banks were usually very high quality mechanical toys. The banks encouraged children to place coins into the bank, because that was the only way to activate the toy. The present invention returns this art form by providing new features to a novelty bank that have never before been used. The new novelty bank is interactive and encourages a child to save money through the use of interactive operational protocols, as is described and claimed below.

SUMMARY OF THE INVENTION

The present invention is a novelty bank assembly and its associated method of operation. The novelty bank assembly includes a bank structure that defines an internal money compartment. An animated character is also provided that is connected to the bank structure. Within the novelty bank assembly is a microprocessor that senses when money is added to or removed from the money compartment. The microprocessor also controls movements of the animated character and broadcasts selected audible phrases.

The microprocessor moves the animated character and broadcasts selected phrases depending upon the condition of the novelty bank assembly and the action of a person using the novelty bank assembly. For instance, the movements of the animated character and the audible phrase that is broadcast may be different if a person is depositing money into a full bank or attempting to take money from a nearly empty bank. The movements of the animated character and the audible phrases that are broadcast are selected to encourage a person, especially a child, to use the novelty bank assembly to save money.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention is a novelty bank that contains both a locked money compartment for storing money and an animated character. The appearance of the animated character and the appearance of the bank that defines the money compartment can each take many different forms and are subject to the whims and preferences of the bank manufacturer. In an exemplary embodiment of the novelty bank that is provided with this specification, the money compartment is disposed in a pedestal base. The animated character is a person standing on the pedestal base. In the shown embodiment, the person is a cowboy and the entire bank assembly has a cowboy motif. However, it will be understood that such a configuration is merely exemplary and any other motif or configuration can be used. Furthermore, the animated character, need not be a person, but can be an animal or an object, such as a pig or a hand.

Figure 1:
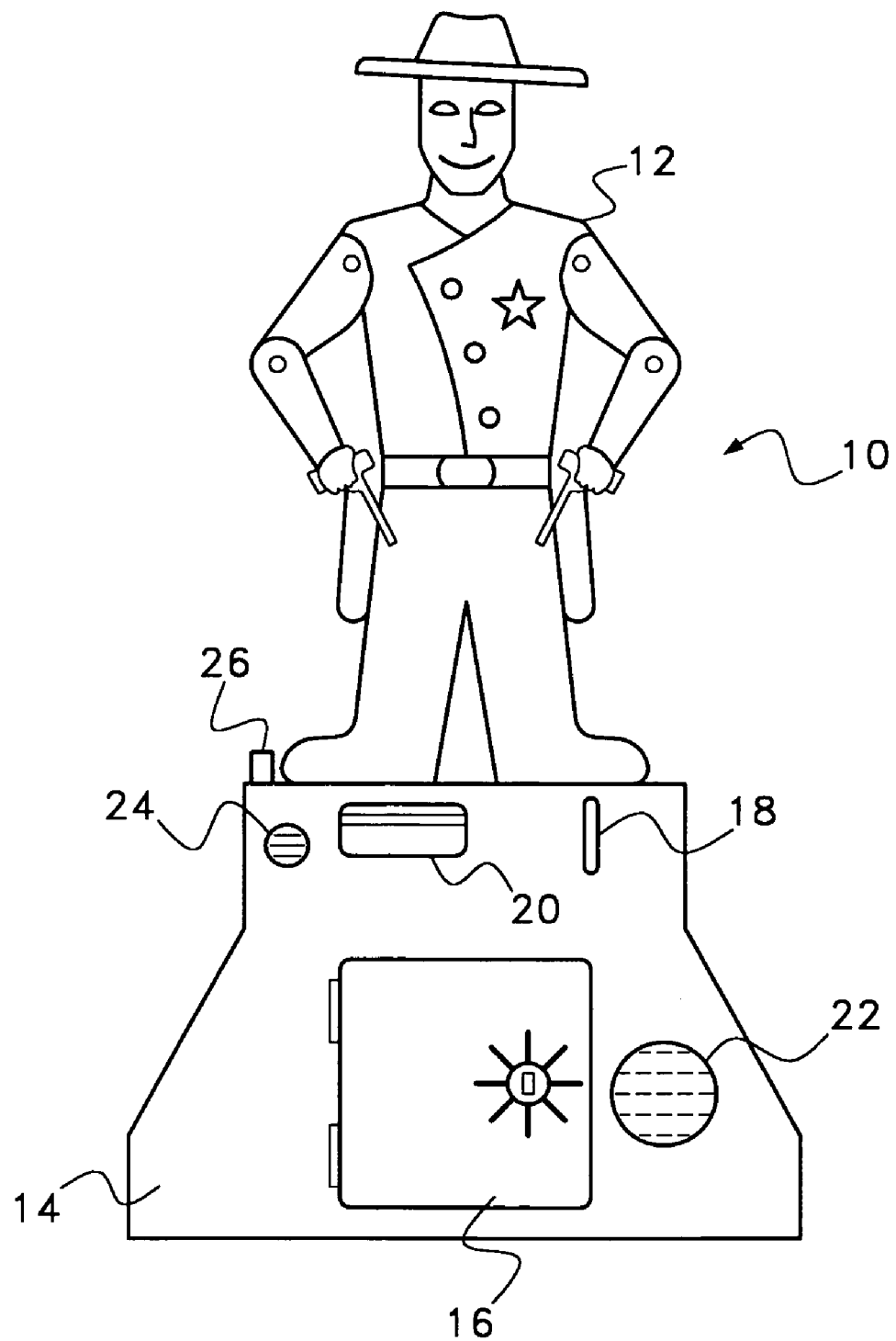
FIG. 1 is a front view of an exemplary embodiment of the present invention novelty bank.

Referring now to FIG. 1, a novelty bank assembly 10 is shown. The novelty bank assembly 10 contains an animated character 12 that stands upon a pedestal base 14. In the shown embodiment, the animated character 12 is a cowboy. The cowboy is capable of animated movement, wherein the cowboy can move its arms and draw a pair of guns from his sides. However, such animation is exemplary, and many other animated movements can be made, wherein the animated character 12 moves its hat, head, neck, torso, arms, waist, legs and/or feet.

The electro-mechanical components used to move the animated character 12 are contained both within the structure of the animated character 12 itself and the structure of the base pedestal 14.

A money compartment is defined within the structure of the pedestal base 14. The money compartment is accessible through a locked door 16. The locked door 16 can have a combination lock, a key lock or an electronic code lock. As such, access to the money compartment is restricted to only authorized persons. In a simplified version of the assembly, the door 16 need not have a locking mechanism.

Money is placed into the money compartment by inserting money through one or more money ports. In the shown embodiment, two money ports are provided. The first money port is a coin slot 18 that is used to accept coin money. The second money port is a bill acceptor 20. The bill acceptor 20 has rollers that engage paper money and pull the paper money into the money compartment within the pedestal base 14. The rollers can be motorized or can be hand-cranked.

A speaker 22 is present within the structure of the novelty bank 10 that broadcasts audible sounds and messages out from the novelty bank 10. An optional microphone 24 may also be present in order that audible sounds and messages can be recorded by the novelty bank 10 for later use.

A try-me button 26 is optionally provided. The try-me button 26 selectively activates the novelty bank assembly 10 without having to place money into the novelty bank assembly 10 or take money from the novelty bank assembly 10. In this manner, the novelty bank assembly 10 can be tried while still in its packaging on a store shelf.

Within the novelty bank assembly 10 is a microprocessor. The microprocessor controls the movements of the animated character 12 and the transmission of audio signals from the speaker 22. However, the movements created in the animated character 12 and the audio signals transmitted through the speaker 22 are dependent upon a variety of interactive variables.

Contained within the novelty bank assembly 10 are various sensors. The sensors detect when the door 16 to the money compartment is opened and closed. Sensors also sense when money is added to the novelty bank assembly 10, via one of the money access ports 18, 20. Sensors can also be provided to sense the value of the money added to the novelty bank assembly 10. Lastly, a sensor can be provided that senses the volume or value of money contained within the novelty bank assembly 10. The movement of the animated character 12 and the audio signals broadcast by the speaker 22 are dependent upon the readings of these various sensors and the sequence of changes detected by the sensors.

Figure 2:
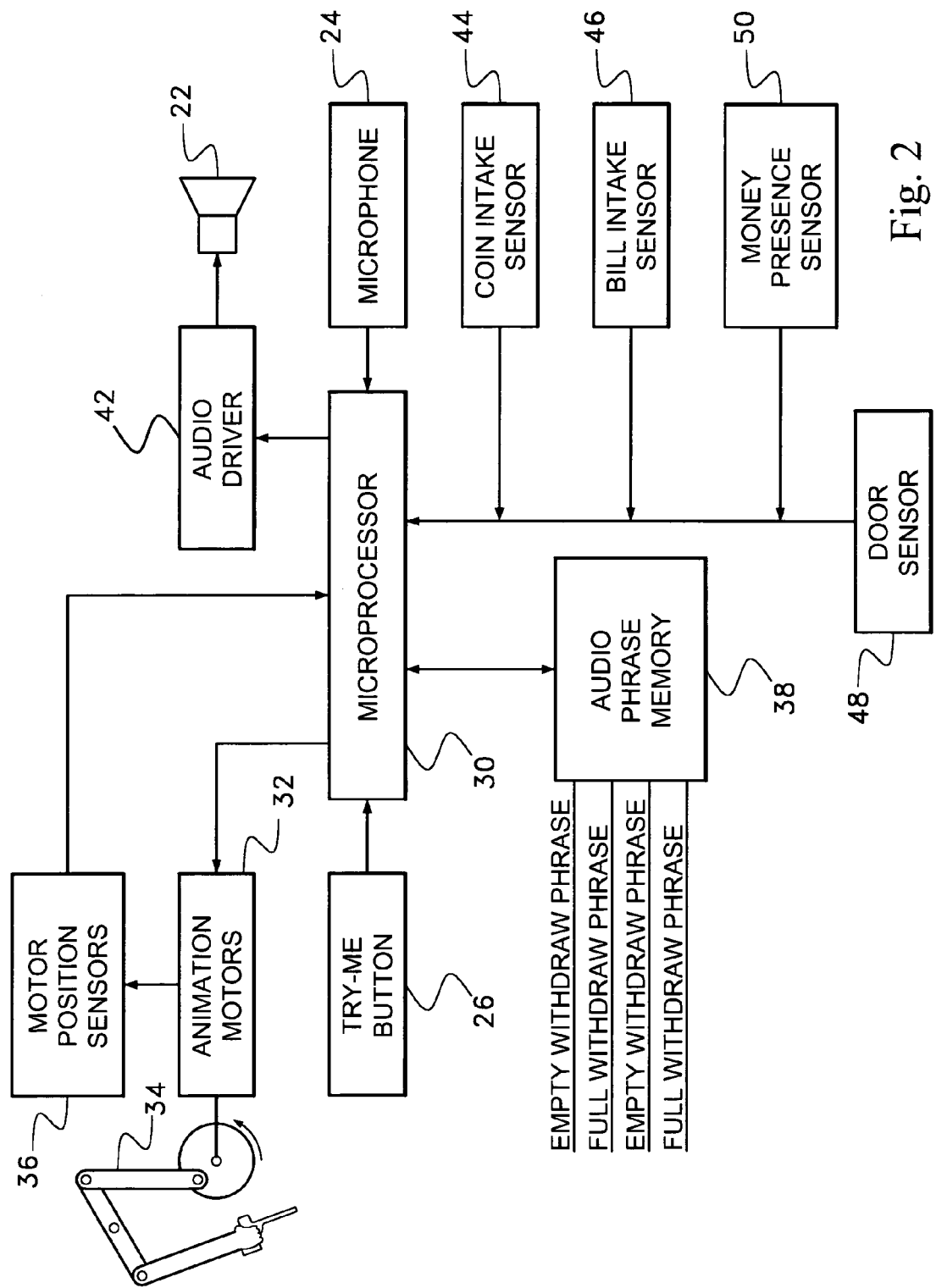
FIG. 2 is a schematic illustrating the electrical components and sensors of the present invention system.

Referring to FIG. 2, it can be seen that contained within the structure of the novelty bank assembly 10 is a microprocessor 30. The microprocessor 30 selectively controls the operation of various animation motors 32. The animation motors 32 are coupled to linkages 34 that extend through the animated character and move parts of the animated character. The animation motors 32 may also be monitored by position sensors 36 that inform the microprocessor 30 of the position of the animation motors 32, and thus the position of the animated character moved by the animation motors 32. In the shown embodiment, the animation motors 32 and linkages 34 are used to raise and lower the gun arms of the cowboy. However, as has been explained, many other movements can be engineered.

As will be explained, the movement of the animated character is dependent upon interactive conditions sensed by the microprocessor 30. However, the animated character can also be activated by pressing the try-me button 26. In this manner, the novelty bank assembly can be tested by a potential consumer while the novelty bank assembly is still in its packaging.

An audio message memory 38 is accessible by the microprocessor 30. The audio message memory 38 contains a menu of preprogrammed audible phrases. In the example illustrated, four sets or types of audible phrases stored in the audio message memory 38. Two types of preprogrammed audio phrases are used when money is added to the novelty bank assembly. Similarly, two types of preprogrammed audible phrases are for when money is taken from the novelty bank assembly 10. The two types of audible phrases used when money is added to the novelty bank assembly include phrases for when the money compartment is full and phrases for when the money compartment is empty. Similarly, the types of phrases used when money is taken from the novelty bank assembly include phrases for when the money compartment is full and phrases for when the money compartment is empty. In alternate versions of the assembly there can be more or less than three types of phrases that can be used.

Several preprogrammed phrases are contained in the audio phrase memory 38. The audio phrase memory 38 can be read only memory (ROM), where one of the preprogrammed phrases must be used. However, in the embodiment of FIG. 2, a microphone 40 is shown. The microphone 40 is coupled to the audio phrase memory 38 via the microprocessor 30. In this embodiment, the audio phrase memory 38 is a random access memory (RAM) wherein new phrases spoken into the microphone 40 can be recorded in the phrase access memory 38 for future use.

The microprocessor 30 is coupled to an audio driver 42 that converts the digitally stored audio phrases from the audio phrase memory 38 into audio signals for a speaker 22. The microprocessor 30 selects a particular phrase from the audio phrase memory 38 depending upon the status of the various sensors in the novelty bank assembly.

From FIG. 2, it can be seen that a coin intake sensor 44 is provided. The coin intake sensor 44 is disposed in the coin slot 18 (FIG. 1) so that it detects when coins are placed into the coin slot. The coin intake sensor 44, in a simple form, can simply detect when a coin passes into the coin slot 18 (FIG. 1). In a more complex configuration, the coin intake sensor 44 can detect the size, and thus the value, of the coins entered into the coin slot. The prior art of vending machines is replete with coin validation sensor assemblies that detect the presence and value of coins. Any such coin validation sensor assembly can be adapted for use as part of the present invention.

A bill intake sensor 46 is also provided. The bill intake sensor 46 is disposed in the bill acceptor 20 (FIG. 1) so that it detects when a bill is received into the bill acceptor. The bill intake sensor 46, in a simple form, can simply detect when a bill is received. In a more complex configuration, the bill intake sensor 46 can scan and detect the value of the bill received. The prior art of vending machines is replete with bill validation systems that scan and detect the value of paper money. Any such bill validation system can be adapted for use as part of the present invention.

A door sensor 48 is attached to the door 16 (FIG. 1) that leads to the internal money compartment. The door sensor 48 is connected to the microprocessor 30 and enables the microprocessor 30 to detect if the door 16 (FIG. 1) is open, closed or whether the status of the door has just changed.

A money presence sensor 50 may also be included as part of the novelty bank assembly. The money presence sensor 50 detects whether or not money is present within the internal money compartment of the bank. In a simple form, the money detection sensor 50 can detect if at least some nominal amount of money is present within the money compartment of the bank. In more complex embodiments, the money presence sensor 50 can detect the volume of money contained within the money compartment.

Figure 3:
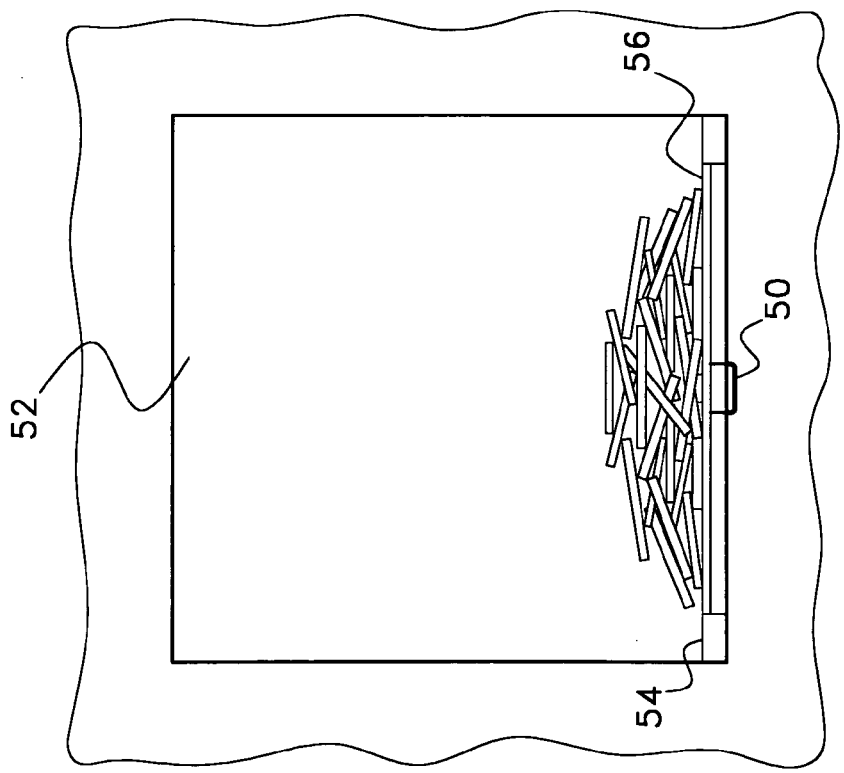
FIG. 3 is a schematic illustrating a first type of money presence sensor that can be utilized by the present invention.

Referring to FIG. 3, a schematic of the money compartment 52 is shown having an exemplary embodiment of the money presence sensor 50. In this embodiment, a segment of the floor 54 of the money compartment 50 is covered in a flexible cover 56. Below the flexible cover 56 is the money presence sensor 50 in the form of a weight sensor. As more and more money is added to the money compartment 52, the flexible cover 56 will deform under the weight of the money. As such, the money presence sensor 50 will provide a signal proportional to the amount of coins present in the money compartment 52.

Figure 4:
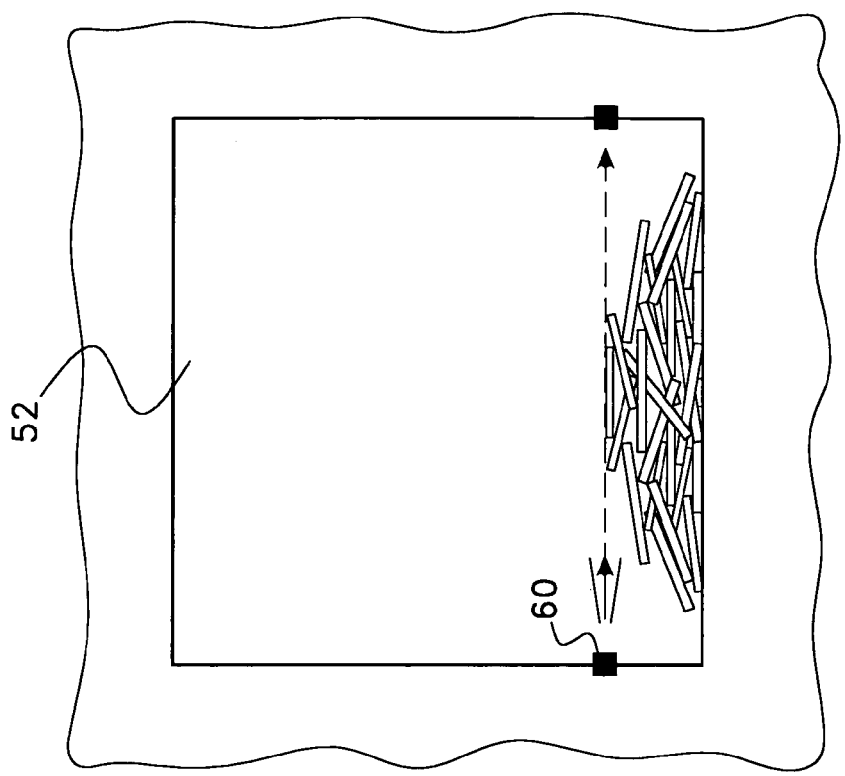
FIG. 4 is a schematic illustrating a second type of money presence sensor that can be utilized by the present invention.

Referring to FIG. 4, an alternate embodiment is shown of a money sensor system that detects the presence of money in the money compartment 52. In the embodiment of FIG. 4, the money presence sensor takes the form of an optical sensor 60 that is positioned at a predetermined height in the money compartment 52. When the amount of money in the money compartment 52 reaches a predetermined height, the optical sensor 60 is triggered by the presence of the money in the money compartment 52. Thus, it can be determined that at least some predetermined minimum amount of money is present within the money compartment 52.

Returning to FIG. 2, it will now be understood that the microprocessor 30 can determine if money is present in the money compartment of the bank in multiple ways. In a first circumstance, if money has been detected entering the bank through either the coin access slot 18 (FIG. 1) or the bill acceptor 20 (FIG. 1) and the door 16 (FIG. 1) of the bank has not been opened, it can be safely assumed that money is present in the money compartment of the bank. If multiple additions have been registered by the microprocessor 30 without the door 16 (FIG. 1) being opened, it can be assumed that a significant amount of money is present within the money compartment of the bank. However, once the door 16 (FIG. 1) to the money compartment is opened, the microprocessor's calculations are negated.

Once the door 16 (FIG. 1) to the money compartment is opened, the microprocessor 30 can assume that the bank is empty. However, if the money presence sensor 50 is used, the microprocessor 30 can detect the presence or absence of money in the money compartment and make a rough determination as to whether or not the money in the money compartment exceeds a predetermined minimum value.

If the amount of money calculated or sensed by the microprocessor 30 is determined to be under a predetermined value, the microprocessor 30 will consider the money compartment empty for the purposes of generating audio signals. Alternatively, if the amount of money in the money compartment is calculated or sensed to be over a predetermined value, the microprocessor 30 will consider the money compartment full, for the purposes of generating audio signals.

Figure 5:
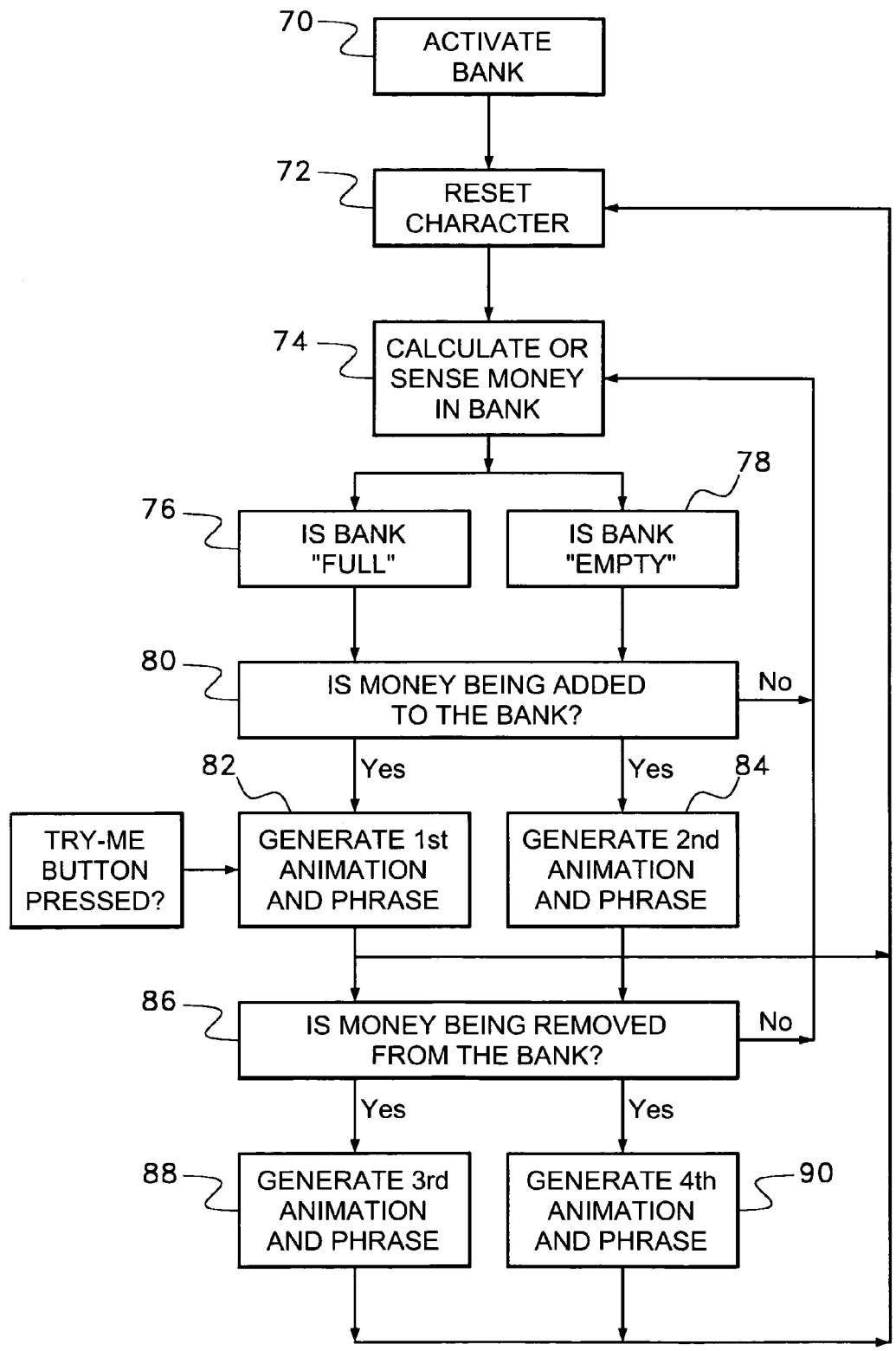
FIG. 5 is a block diagram showing an exemplary method of operation for the present invention novelty bank.

Referring now to FIG. 5, an exemplary method of operation is disclosed for the present invention novelty bank assembly.

As is indicated by Block 70, the novelty bank assembly is first activated. This is done by either placing batteries into the novelty bank assembly or plugging the novelty bank assembly into a power source. The novelty bank assembly may contain an on/off switch. If such a switch is present, the novelty bank assembly is activated by the movement of the on/off switch to the "on" position.

Once the novelty bank assembly is activated, the microprocessor 30 within the novelty bank assembly directs the animation motors to reset the animated character into a starting position. See Block 72.

After the novelty bank assembly is activated and reset, the microprocessor calculates or senses the amount of money contained within the novelty bank assembly. See Block 74.

If the novelty bank assembly has a money presence sensor, the amount of money in the bank is sensed. If no such sensor is present, a determination of the amount of money is made by summing up the number of times money has been deposited into the bank from the last time the door of the bank was opened.

Through either direct sensing or calculations, the microprocessor makes a determination if the bank is in a "full" condition, "empty" condition or some intermediate condition. A determination that the novelty bank assembly is in a "full" condition does not literally mean that the novelty bank assembly is filled to capacity with money. It merely means that the novelty bank assembly contains more than some predetermined minimum amount of money. Likewise, a determination that the novelty bank assembly is an "empty" condition does not mean that the novelty bank is devoid of all money. Rather, an "empty" condition merely means that the novelty bank assembly contains less than a predetermined minimum amount of money.

As such, the microprocessor will always consider the novelty bank assembly to be in one of two conditions. Those conditions being the "full" condition and the "empty" condition. See Block 76 and Block 78.

As is indicated by Block 80, once money is added to the novelty bank assembly, the microprocessor senses the added money and causes two actions. The first action is to animate the character on the bank. The second action is to retrieve a phrase from the audio phrase memory and broadcast that phrase aloud. The animation created in the character and the phrase that is broadcast is determined by whether the microprocessor considers the bank to be in a "full" condition or in an "empty" condition.

From Block 82, it can be seen that if the microprocessor considers the bank to be in a "full" condition, a first animation sequence is generated in the character and a full deposit phrase is selected for audible transmission. An appropriate phrase to accompany the deposit of more money into a "full" bank would be: "Ha, Ha, I love money", or "I'm one hungry cowboy, keep it coming". An appropriate animation would be to have the cowboy raise his arms over his head and wave the arms back and forth.

From Block 84, it can be seen that if the microprocessor considers the bank to be in an "empty" condition, a second animation sequence is generated in the character and an empty deposit phrase is selected for audible transmission. An appropriate phrase to accompany the deposit of money into an "empty" bank would be: "You haven't saved much yet", or "I forgot what money looked like". An appropriate animation would again be to have the cowboy raise his arms over his head and waive the arms back and forth.

After the selected phrase is broadcast and the selected animation completed, the character resets and the microprocessor determines if the added money changes the empty/full condition of the novelty bank assembly. As is indicated by Block 86, when the door of the novelty bank assembly is opened so that money can be removed, the microprocessor senses the condition and causes two actions. The first action is to animate the character on the bank. The second action is to retrieve a phrase from the audio phrase memory and broadcast that phrase aloud. The animation created in the character and the phrase that is broadcast is again determined by whether the microprocessor considers the bank to be in a "full" condition or an "empty" condition.

From Block 88, it can be seen that if the microprocessor considers the bank to be in a "full" condition, a first animation sequence is generated in the character and a full withdrawal phrase is selected for audible transmission. An appropriate phrase to accompany the deposit of more money into a "full" bank would be: "Touch any of the money and I'll shoot", or "Call the sheriff, there's a bank robbery". An appropriate animation would be to have the cowboy raise his arms half way, thereby holding the guns forward.

From Block 90, it can be seen that if the microprocessor considers the bank to be in an "empty" condition, a second animation sequence is generated in the character and an empty withdrawal phrase is selected for audible transmission. An appropriate phrase to accompany the withdrawal of money from an "empty" bank would be: "You didn't get much did you?", or "Are you happy now". An appropriate animation would be to have the cowboy wave his arms up and down.

After the selected phrase is broadcast and the selected animation completed, the character resets and the microprocessor determines if the withdrawn money changes the empty/full condition of the bank.

As has been previously stated, the novelty bank can come with a try-me button that activates the bank without having to put money into the bank. As is indicated by Block 92, when the try-me button is pressed, the character is animated and an audible phrase generated as if money were being added to the bank.

It will be understood that the novelty bank assembly specifically illustrated and described, along with its method of operation, is merely exemplary and many alterations can be made to the invention. For instance, the shape of the base platform and the character used in the bank are irrelevant. Any designs can be used. Furthermore, how the character animates and the audible phrases that are broadcast are a matter of choice for the bank designer. All such variations, modifications and alternate embodiments are intended to be included within the scope of the present invention as defined by the appended claims. What remains the heart of the invention is that the novelty bank is interactive and interacts with a user each time money is placed into or withdrawn from the bank.

What is claimed is:

1. A novelty bank assembly, comprising:
   a bank structure that defines an internal money compartment;
   an access door disposed in said bank structure for selectively accessing said money compartment;
   at least one money port disposed in said bank structure for passing money into said money compartment;
   a first sensor for sensing when money is added to said money compartment through said at least one money port;
   a second sensor for sensing when said access door is opened; and
   a character coupled to said bank structure, wherein said character moves through a first animated sequence when said first sensor detects that money is being passed into said at least one money port and wherein said character moves through a second animated sequence when said second sensor detects that said access door is opened.

2. The assembly according to claim 1, further including a microprocessor for determining if said money compartment is in a full condition, where more than a predetermined amount of money is present within said money chamber, or an empty condition, where less than a predetermined amount of money is present within said money compartment.

3. The assembly according to claim 2, further including a speaker for broadcasting a selected audio message when said character is animated, wherein said selected audio message depends upon whether said character is moving through said first animated sequence or said second animated sequence.

4. The assembly according to claim 3, wherein said selected audio message is selected from a plurality of audio message types, wherein said audio message types include message types for when said money chamber is in said full condition and message types for when said money chamber is in said empty condition.

5. The assembly according to claim 4, further including a microphone for recording custom audio messages into said memory, wherein said custom audio messages become part of said plurality of audio types.

6. A novelty bank assembly, comprising:
   a bank structure that defines an internal money compartment;
   an access door disposed in said bank structure for selectively accessing said money compartment;
   at least one money port disposed in said hank structure for passing money into said money compartment;
   a first sensor for sensing when money is added to said money compartment through said at least one money port;
   a second sensor for sensing when said access door is opened;
   a microprocessor for determining if said money compartment is in a full condition, where more than a predetermined amount of money is present within said money chamber or an empty condition, where less than a predetermined amount of money is present within said money compartment,
   a character coupled to said bank structure, wherein said character moves through a first animated sequences when said first sensor detects that money is being passed into said at least one money port and wherein said character moves through a second animated sequence when said second sensor detects that said access door is opened;
   a speaker for broadcasting different audio messages during said first animated sequence and said second animated sequence, wherein content of said audio messages are dependent upon whether said money compartment is in said full condition or empty condition.

7. A novelty bank assembly, comprising:
   a pedestal base having an internal money compartment that is accessible by both a coin slot and a coin removal door;
   a first sensor for sensing when money is past through said coin slot;
   a second sensor for sensing when said access door is opened;
   a microprocessor that determines whether more than a predetermined amount of money is present in said money compartment, therein providing a determination if said money compartment is in a full condition or empty condition;
   a speaker for broadcasting audio messages of different message type, wherein said message types depend upon whether said money compartment is in said full condition or said empty condition and whether said first sensor or said second sensor is activated;
   a character positioned atop said pedestal base, wherein said character moves through an animated sequence when said first sensor and said second sensor are activated.

* * * * *